United States Patent

[11] 3,580,462

| [72] | Inventor | Louis Vanyi |
| | | 246 Crestwood Ave., Ventura, Calif. 93003 |
| [21] | Appl. No. | 690,590 |
| [22] | Filed | Dec. 14, 1967 |
| [45] | Patented | May 25, 1971 |

[54] SOLDERING APPARATUS
16 Claims, 29 Drawing Figs.

[52] U.S. Cl. ................................................ 228/51,
29/626, 219/233, 228/52, 228/53, 228/54, 228/55
[51] Int. Cl. ............................................................ B23k 3/02
[50] Field of Search............................................ 228/51, 52,
53, 54, 55; 219/233, 237, 229

[56] References Cited
UNITED STATES PATENTS

| 2,991,550 | 7/1961 | Block | 29/17X |
| 3,062,078 | 11/1962 | Hulls | 29/17X |
| 2,790,058 | 4/1957 | De Verrier | 228/53 |
| 2,791,669 | 5/1957 | Ferrara | 219/237 |
| 3,157,143 | 11/1964 | Van Embden | 228/54 |

Primary Examiner—Charlie T. Moon
Assistant Examiner—Robert J. Craig
Attorneys—Q. Baxter Warner and George J. Rubens ABSTRACT: A soldering iron tip and method of soldering wherein the amount of solder applied is closely controlled and excess solder is automatically removed. It employs an elongate heated applicator with a solder reservoir area, said heated applicator having a plurality of small apertures on its work contacting face each leading to the reservoir area. In one embodiment the tip is made up of a bundle of rigid rods encased in a sleeve, the rods terminating substantially even with the end of the sleeve and the tip end being shaped to contact the work. It employs capillary attraction to apply solder and to draw excess solder off of a workpiece and into the reservoir area. When the reservoir is full of brief shake will dislodge accumulated solder from the reservoir and clear it for future use.

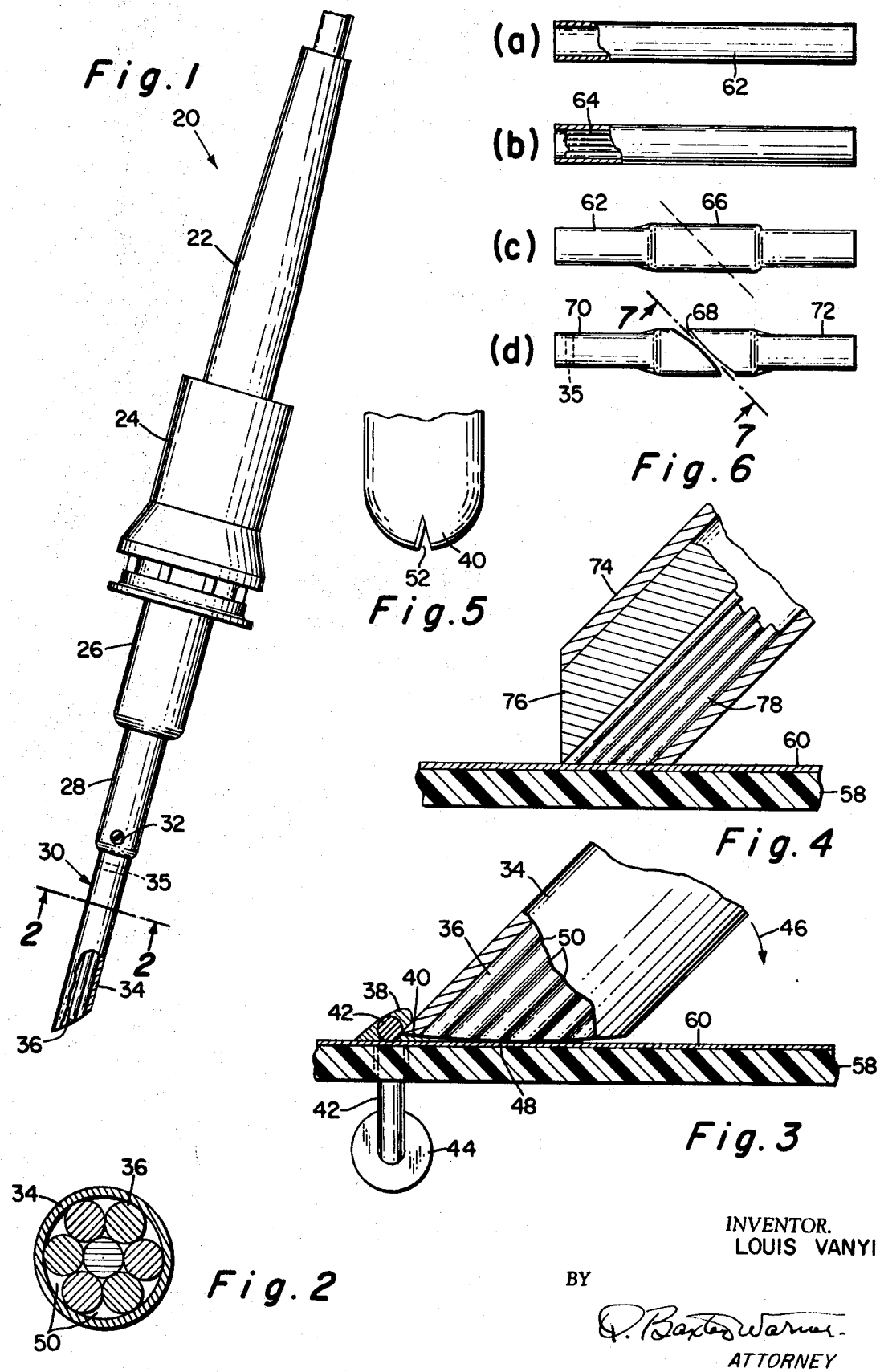

PATENTED MAY25 1971 3,580,462
SHEET 4 OF 4
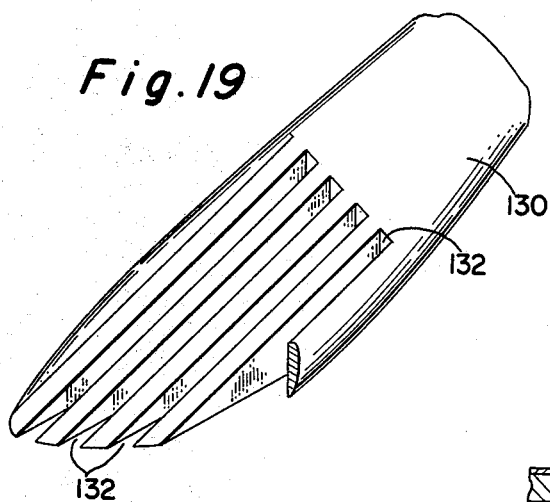
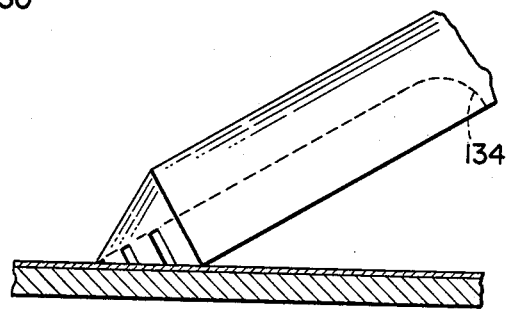
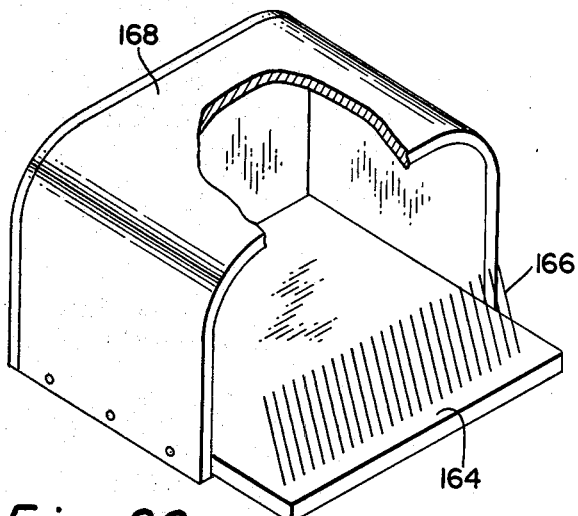
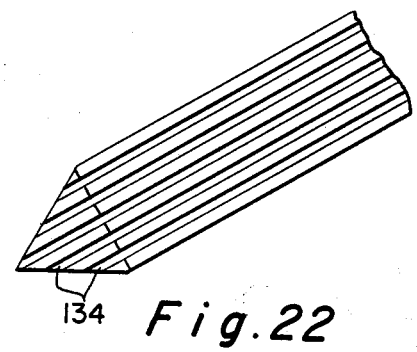
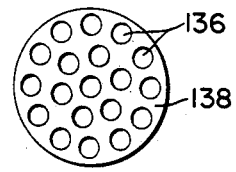
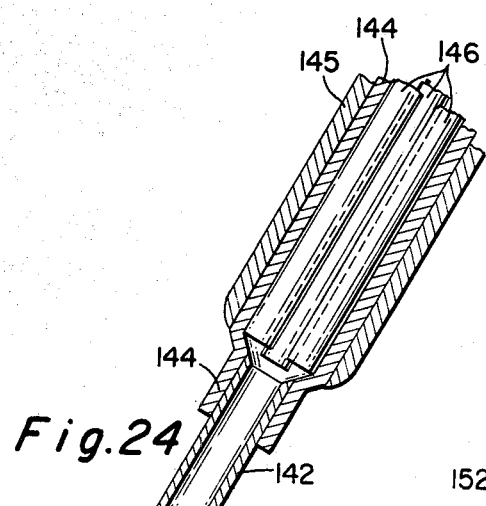
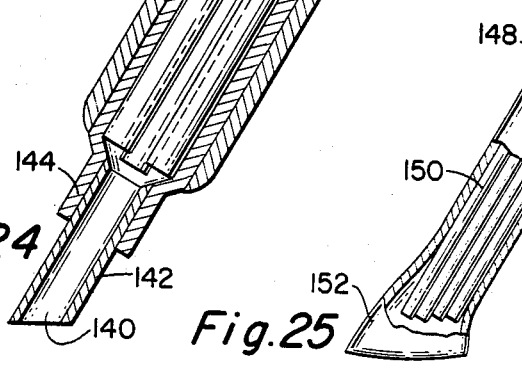
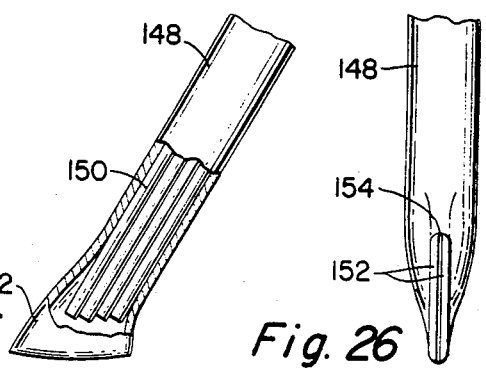

SOLDERING APPARATUS

The invention described herein may be manufactured and used by or for the Government of the United States of America for governmental purposes without the payment of any royalties thereon or therefor.

BACKGROUND OF THE INVENTION

1. Field of the Invention

This invention relates to soldering techniques and methods and to apparatus therefore. It is usable generally in any soldering operation but especially where controlled application of solder is important and excess may be detrimental. It is particularly effective when used on printed circuit and similar work since it assures application of only enough solder to coat or tin the surface and any excess is automatically removed during the soldering process. The work may be either large or small in dimension and the invention may be used for tinning and desoldering as well as the usual soldering operations.

2. Description of the Prior Art

Many attempts have been made to control the application of solder to a work piece and to satisfactorily remove excess solder therefrom. Prior automatic apparatus and methods involve "wave" or dip-type soldering techniques which may utilize centrifugal force to throw excess solder from a rapidly rotated work piece. Prior hand tools for excess solder removal include suction bulbs, solder gobblers, "sniffers", vacuum lines, spring loaded plungers or bulky squeeze bulbs. Such devices usually require two-handed manipulation and the two-step operation of first heating the work and later sucking off the molten solder with attendant difficulty in limiting the amount of heat applied to the workpiece while rendering the solder fluid. Excess heat can quickly damage or destroy the delicate equipment usually associated with printed circuit assemblies.

In printed circuit boards component lead wires extend through openings in the board and are then bent over and soldered in place from the opposite side. Such bent over portion should lie upon and make electrical contact with the printed circuit surface which latter is usually a very thin film of copper. Thereafter a good smooth solder fillet should be formed to hold the lead in intimate contact with the printed circuit film and to produce a sound metallurgic joint. The art of producing proper solder-fillet joints with optimum terminal or lead tie-down geometry is a precise one. The surface must be properly prepared with a suitable flux such as rosin flux, and a thin tinning coat must be applied to the proper conducting surfaces of the PC board to eliminate copper oxidation. Such coating preferably ranges from 0.003 to 0.0001 inch. Thereafter the component lead is inserted through the board and is bent over to lie flush against the printed circuit film on the board. A limited amount of solder is then applied to establish a smooth, strong fillet joint between lead wire and film.

Controlled solder fillets are very important, especially in missile and aircraft printed circuit work where excessive vibration may occur. A large fat round excess solder fillet is not desired since it prevents inspection of the solder joint and adds nothing to the strength or current carrying capacity of the joint. Solder is not only used at joints and connections but all the copper strips on the printed circuit board are usually coated or "tinned" to protect the copper surface and to ensure electrical continuity. Attempts have been made to paint on solder with heated flexible brushes having flexible bristles however poor heat conductivity and short life rendered such devices unsatisfactory.

It will be apparent that controlled application of solder eliminates glomeration or clumping and prompt positive removal of excess solder before it hardens assures that there will be no untidy residue to mar the perfection of the workpiece. Such control of the application of solder also controls application of heat and minimizes the possibility of board warpage and component damage which complicate the manufacture and maintenance of microminiaturization assemblies.

Other prior art problems include adequate expulsion of flux gases and vapors from the joint area which, in joints containing excess solder, cause high resistance resulting from flux entrapment and failure adequately to wet the workpiece.

The joint should be subject to sufficient temperature to ensure adequate surface wetting, this ordinarily exceeds the melting point of the solder or the liquidus temperature by at least 100°F. However excess temperatures or the imposition of heat for a longer time than is necessary to effect a firm bond risks damage to the components being soldered.

The apparatus and method of the present invention are particularly adapted to automated use wherein it is desired to replace the dip or "wave" type operation with the precise application of solder at select points and in a controlled fashion.

SUMMARY

The surface tension or contractile surface force of a liquid which makes it tend to assume a spherical form and present the least possible exterior surface is employed to control the application of molten solder to a work area and to withdraw excess solder therefrom. The soldering apparatus of this invention has a plurality of relatively small apertures in the work contacting area which connect to elongate internal passages. In one embodiment the passages are formed between small diameter rigid rods assembled in a bundle. The cross-sectional area of such passages varies with the diameter and shape of the rods. By the method of this invention the solder applying operation is associated with a solder removing operation and the solder so removed is stored for subsequent application to a new work surface or is eliminated from the tip where further solder removal from a work surface is desired.

It is an object of the present invention to provide a solder applying apparatus and method by which solder may be applied in controlled amounts.

It is another object to provide a solder removing apparatus and method by which solder may readily be withdrawn from a workpiece.

It is a further object to provide an apparatus and method whereby the workpiece is heated no more than necessary to cause flow of solder thereto or therefrom.

Another object is to provide a soldering tool and soldering method whereby just the right amount of solder is deposited upon the work and any excess solder is removed while still molten.

Another object is to provide a lightweight, simple and trouble free soldering tool of the character described wherein accumulated excess solder may quickly and easily be discharged from the tool.

A further object is to provide a method of soldering which assures that sufficient solder is applied to the workpiece but which keeps excess solder from accumulating upon the workpiece.

Other objects, advantages, and novel features of the invention will become apparent from the following detailed description of the invention when considered in conjunction with the accompanying drawings.

BRIEF DESCRIPTION OF THE DRAWINGS

FIG. 1 is a side elevation with a portion broken away showing a tip of the present invention mounted in a conventional electrically heated soldering pencil.

FIG. 2 is an enlarged cross-sectional view taken along a line substantially corresponding to line 2–2 of FIG. 1.

FIG. 3 is an enlarged detailed view partially broken away of the work contacting end portion of a soldering tool showing its use in desoldering a component from a printed circuit board.

FIG. 4 is a vertical sectional view of a modified form of tip wherein one-half of the tip comprises a conventional soldering device.

FIG. 5 is a detail face view of the toe of a soldering tip similar to that shown in FIG. 3 but wherein a small notch is provided in the tip nose to facilitate straightening a bent over component lead during a desoldering operation.

3,580,462

FIG. 6(a), (b), (c), (d) are side elevational views partially in section showing the steps of inserting rod cores in a sleeve, flattening the sleeve and bisecting the sleeve at an angle through the flattened portion to provide two separate tips of the character which may be employed with the soldering pencil of FIG. 1.

Figure 7:
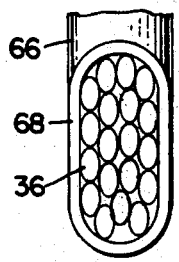

FIG. 7 is an enlarged view looking along a line substantially corresponding to line 7-7 of FIG. 6(d) showing the work contacting face in the form of a rectangle with rounded ends.

Figure 8:
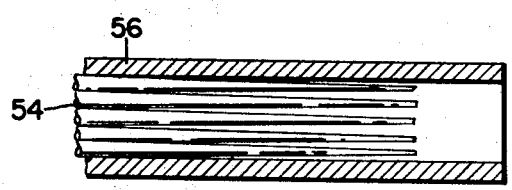

FIG. 8 is a vertical sectional view through a tip having an alternative construction wherein the core is formed of tapering rods.

Figure 9:
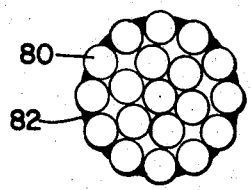

FIG. 9 is an end view of another alternative tip construction wherein the core is encased in a tube formed by welding the peripheral layer of rods to each other.

Figure 10:

FIG. 10 is a side elevation of a further embodiment wherein the core is compacted into an assembly by a wrap of coiled wire.

Figure 11:
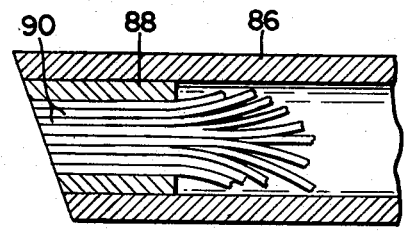

FIG. 11 is sectional view of another embodiment wherein the heat transmission path to the core is through a bushing and there is provided an enlarged enclosed reservoir space.

Figure 12:
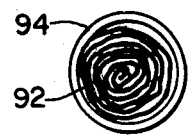

FIG. 12 is an end view of a core formed of rolled sheet metal.

Figure 13:
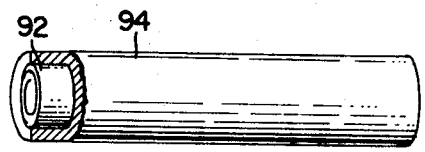

FIG. 13 is a perspective view, with a portion broken away, of the sheet metal core of FIG. 12.

Figure 14:
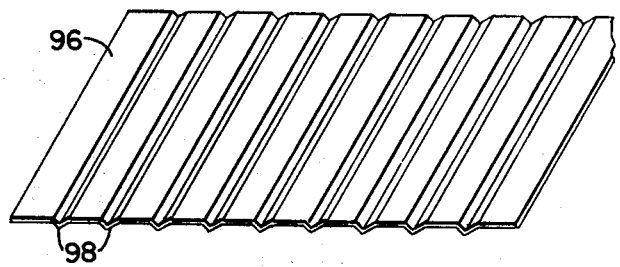

FIG. 14 is a perspective view of a corrugated metal sheet from which a core may be made.

Figure 15:
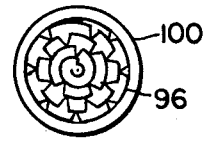

FIG. 15 is an end view of a core formed from the corrugated metal sheet illustrated in FIG. 14.

Figure 16:
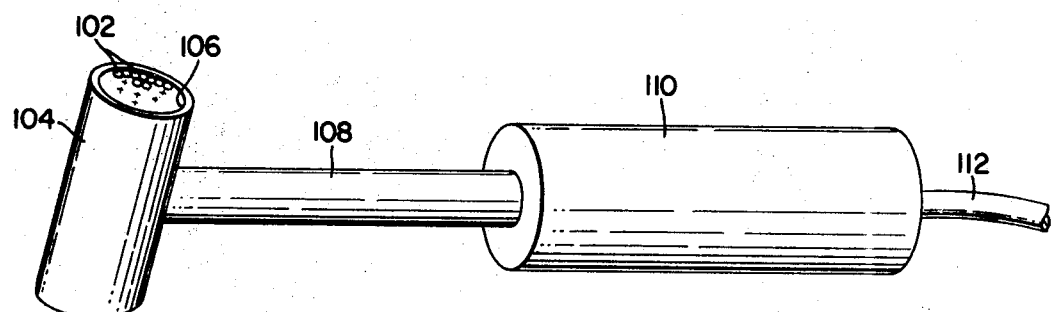

FIG. 16 is a perspective view of another tool embodying the device of the present invention wherein the end opposite the work contacting surface of the tool is open to permit excess solder removal therethrough.

Figure 17:
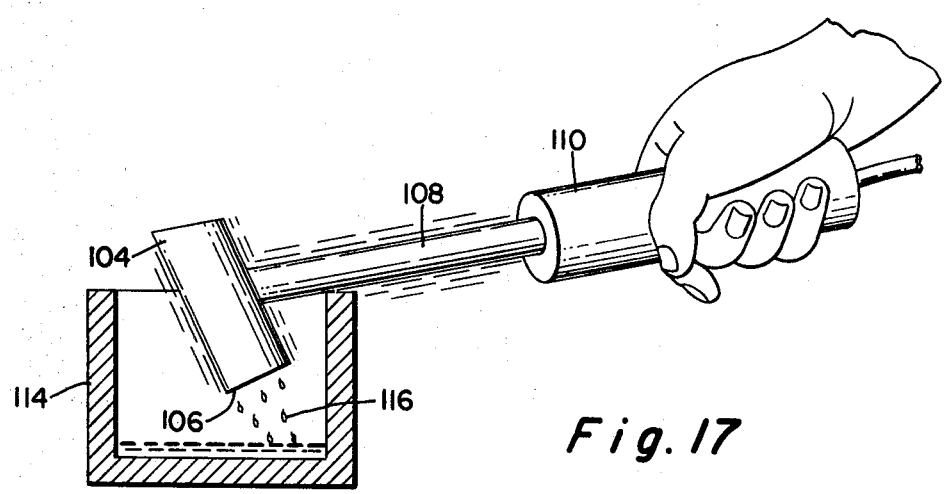

FIG. 17 is a perspective view showing one manner of removing excess solder from the open end of the tool of FIG. 16.

Figure 18:
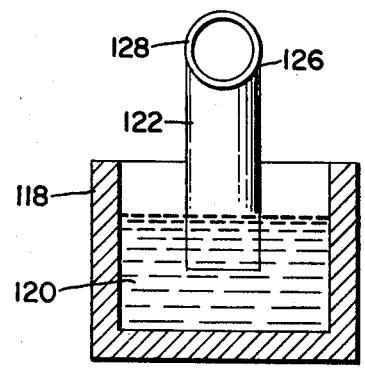

FIG. 18 is a vertical elevational view, partly in section, of a solder pot mounted fixture having a thin film applying and removing work contacting area which is configured to the shape of the work.

FIG. 19 is a perspective view with a portion broken away of another form of the present invention employing narrow slots instead of small inter rod spaces to store solder.

FIG. 20 is a perspective view of a cleaning fixture for a slotted tip of the general character shown in FIG. 19.

FIG. 21 is a side elevational view of a slotted tip similar to the embodiment of FIG. 19 but wherein only one side of the iron is provided with solder accumulating slots.

FIG. 22 is a bottom view of the tip of FIG. 21.

FIG. 23 is an end view of a solid tip which has been drilled to provide a number of relatively small deep openings into which solder may be drawn.

FIG. 24 is a greatly enlarged side elevational view, partially in section of a very small tip which has only one elongate central opening into which molten solder may enter.

FIG. 25 is a side elevation with a portion broken away showing an embodiment wherein the tube sleeve is deformed at the lower end to form a narrow work contacting slit.

FIG. 26 is a rear elevation view of the embodiment of FIG. 25.

Figure 27:

FIG. 27 is a bottom view of a tip having a plurality of slots for contact with the work.

Figure 28:
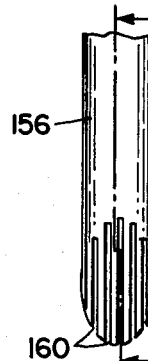

FIG. 28 is a top view of the tip illustrated in FIG. 27.

Figure 29:
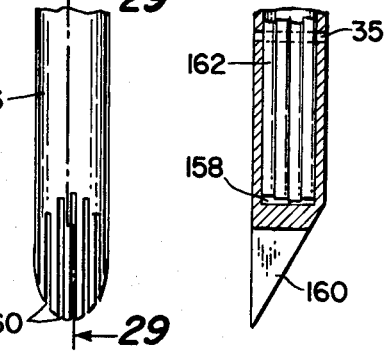

FIG. 29 is a longitudinal sectional view partially in elevation taken along a line substantially corresponding to line 29-29 of FIG. 28.

DESCRIPTION OF THE PREFERRED EMBODIMENT

As the following description progresses it will be apparent that the principles of the method and apparatus of this invention may be embodied in numerous forms in order to achieve the foregoing objectives. In a preferred form it may be used with or incorporated in a hand tool 20 of the character generally illustrated in FIG. 1 and commonly known as an electric pencil-type soldering iron. Such iron usually has a heat insulated handle 22, an enlarged finger grip portion 24 of cork or similar material and a heating unit 26 with a chuck assembly 28 which has an axial opening to receive a solder tip 30 retained in place by a set screw 32.

In conventional soldering apparatus the work contacting tip is of solid material such as copper and the end thereof may be of chisel, pyramid, spade, screw-driver or other shape as is well known in the art. However, in the apparatus of the present invention and in carrying out the method thereof such conventional tip is replaced by one of the tips illustrated in the various FIGS.

In the soldering tip of FIGS. 1 and 2 a tubular sleeve 34 surrounds a core formed of a plurality of rods 36 which are assembled into a bundle as shown and retained in such assembled condition by such sleeve. FIG. 3 shows an enlarged form of such tip wherein the end of the sleeve 34 with encompassed rods 36 is cut at an angle to provide increased work contact area and is slightly rounded at the work contacting surface.

A tip contoured as shown in FIG. 3 is particularly adapted for the controlled application of solder to the thin conductive films of a printed circuit board, also it is especially adapted to the removal of circuit components from such boards. This is accomplished by the melting and removal of solder from individual component lead wires or terminals as when applied in the manner illustrated in FIG. 3 where it will be seen that the solder fillet 38 is first heated by contact with the toe portion 40 of the tip. When the solder 38 melts toe 40 contacts the bent over lead 42 of a component 44. By rocking the handle of the soldering iron downwardly slightly in the direction of the arrow 46 about its central work contacting point 48 the toe 40 of the tip prys up the bent over lead wire portion so that it is at least partially straightened at the same time that excess solder is being removed. During this operation the solder 38, as quickly as it melts, is drawn by capillary attraction into the open end apertures and passages 50 and away from the work surface leaving only that thin coating which adheres by surface tension thereto.

Of course removal of the molten solder as rapidly as it melts serves immediately to remove excess heat, thus preventing heat damage to the removed components or to the printed circuit board. In practice it will be found that the use of this tool in the manner described can be developed into quite an effective desoldering technique since contact of the iron onto the solder fillet immediately starts the solder to melt and, as it melts, the hot solder is withdrawn from the work area into the tip. As soon as the component lead is free the toe 40 is raised to pry up and straighten the wire lead for ready removal without the use of pliers or prongs to straighten the end of the lead so that it may be withdrawn through the hole in the printed circuit board.

The toe portion 40 of the tip may be provided with a notch 52 as shown in FIG. 5 to facilitate engagement of such toe with the lead and to thus aid in straightening the lead, this notch also provides a ready opening for melted solder to pass to the under surface of the tip.

The solder being drawn off of the work and up through the passages 50 is the result of capillary action of the solder on the heated surfaces of the bundled rods. Such action will continue until the passages 50 have been filled for a substantial portion of their length. Such passages in effect comprise reservoirs which, if desired, may be slightly enlarged in size at their upper ends in any suitable fashion as by the use of slightly tapered rods 54 of the type illustrated in somewhat exaggerated form within tube 56 of FIG. 8. It will be apparent that the space about the inner ends of such rods is larger and hence able to accommodate greater amounts of solder.

In practicing the method of the present invention the workpiece, such as a printed circuit board 58 which has a thin film metallic coating or copper conductor surface 60 thereon, should first receive a coating of soldering flux and should thereafter be tinned with a very thin film of solder to facilitate subsequent soldering operations. This tinning operation is conveniently performed with the tool of the present invention by simply applying solder to the heated tip to fill the reservoir and then rubbing the tip along the path of the thin film circuitry to transfer a very thin uniform coat of solder thereto. By the use of this invention it is found that the application of excess solder is avoided by capillary control of solder flow.

After such tinning step, should any excess solder exist at any point it may readily be wiped off by a stroke of the tip over the surface. Thereafter accumulated excess solder may be removed from the reservoir by a downward flick of the hand holding the tool to expel the excess solder into a convenient receptacle. The cleared tip can then be reapplied to the work surface and the small spaces between the bundled rods quickly draw up excess solder from the work leaving only the very thin coating needed thereon for tinning purposes.

Though it has been found that a spade tip with the bottom slightly rounded as shown in FIG. 3 is particularly effective for removing excess solder and simultaneously straightening bent over component leads for ready removal and replacement of single components it will be apparent that this invention may readily be incorporated in other shaped tips such as pencil, screw-driver, chisel, pyramid, etc.

An end view of one effective shape is illustrated in FIG. 7 wherein the rods 64 are encased within a sleeve 66 which has been deformed from a circular to a substantially rectangular configuration with rounded end portions. Such a tip may be conveniently manufactured by the steps illustrated in FIGS. 6(a), (b), (c) and (d). FIG. 6(a) shows a tubular sleeve 62 of material having good heat conductivity such as copper, aluminum, etc. FIG. 6(b) shows the sleeve with a number of rods 64 inserted in place. FIG. 6(c) shows the medial portion 66 of the sleeve being laterally deformed as by compression in a vise. This deformation not only produces the rectangular cross-sectional configuration with rounded ends illustrated in FIG. 7 but also slightly deforms and anchors the rods in place so that they are not easily dislodged. FIG. 6(d) illustrates the manner in which an oblique cut of about 45° may be made through the medial portion of the deformed assembly thereby resulting in two identical tips 70—72 having ends 68 which are preferably thereafter slightly rounded as shown. A radius of 1.12 inches has been found satisfactory for such rounding off step.

A composite tip is shown in FIG. 4 wherein sleeve 74 encloses a solid portion 76 which corresponds to one-half of a conventional soldering iron tip and the other portion is occupied by a bundle of assembled rods 78 of the present invention. It will be noted that by simply rotating this tool 180° either a conventional soldering face or the perforate soldering face of the present invention may be applied to the work surface.

It will be obvious that the bundle of rods may be compacted and retained in assembled relationship by any of several means and FIG. 9 illustrates an embodiment formed entirely of such rods. In this design the rods forming only the peripheral layer 80 are secured together by fusing, welding, brazing, or other suitable means wherein a high strength bond 82 is provided between such rods. Thus the joined rods forming the outer layer creates the tube or sleeve of this embodiment.

In FIG. 10 the bundle confining sleeve is shown formed of a wire wrap 84 which is peripherally applied to encase the bundle. By use of a tight winding tension the bundle of rods may be compacted tightly together.

FIG. 11 illustrates in exaggerated fashion the principle that the inner ends of the rods may be permitted to diverge from each other into a reservoir area. A primary consideration being that there is adequate heat conductivity through the tubing 86 and bushing 88 so that sufficient heat is effectively transmitted to the bundle of rods 90. The gradual separation of the inner ends of the rods from each other in the reservoir area may increase the solder storage capacity.

FIGS. 12 and 13 show an embodiment wherein the core portion is a coiled up sheet 92 of heat conductive metallic material such as copper or iron which is encased within a tube 94. When not too tightly wound slight random openings appear at the end of such coil through which solder may be drawn in the same manner as was discussed previously with respect to the bundle of rods.

In FIGS. 14 and 15 is disclosed a construction wherein the coiled sheet 96 is formed of heat conductive material having a plurality of spaced corrugations 98 which latter serve to provide a pattern of spaced arcuate slots when that sheet is rolled up and retained in place by a peripheral sleeve 100. (See FIG. 15). It will be obvious that the work contacting ends of both these coiled sheet constructions may be shaped in any desired way to facilitate soldering.

In FIG. 16 is illustrated a tool wherein a bundle of fairly rigid rods 102 is supported within an open ended sleeve 104. These rods form small elongate passages which act in the same fashion as the tips previously described. However, in addition this sleeve 104 is open at its upper end 106. The tool may have a suitable heating element and includes an offset handle such as stem 108 terminating in grip 110 through which current for electric heating may be conducted by cord 112. Such tool may have any suitable work contact configuration. As shown, the lower ends of the rods and surrounding tube may be cut at an angle to produce an inclined or spade tip. An important feature is that the reservoir within the tip is open at end 106 so that when the tool is inverted and struck against an abutment such as the edge of a container or solder pot 114, the accumulated solder is ejected from the open end 106 into the pot in the form of particles 116. Such a means for removing excess solder from the part of the tip opposite the work surface is particularly adaptable to use with automated machines as will be apparent to any person skilled in that art.

FIG. 18 illustrates a further embodiment wherein a solder pot 118, having a bath of solder 120 therein which is maintained in molten condition through any suitable heating means, receives the open lower end of a solder tip in the form of an upright tube 122 containing passages extending into an inner region such as may be produced by a bundle of closely assembled rods of the type previously identified. Such tip may have an upper face 126 which is suitably contoured to engage a piece of work. In FIG. 18 the work 128 is shown to be a piece of pipe or tubing which may be placed in contact with the concave upper surface 126 and rotated to apply a tinning coat of solder thereto, the solder being drawn by capillary action up through the bundle from the molten solder bath 120.

FIGS. 19, 21, 22, 23 and 24 illustrate modifications wherein a central core of rigid rods or sheet is not employed. Instead in these modifications small passages are formed in a solid block, said passages being slots or holes extending partially or completely through the tip. In FIG. 19 a tip 130 is shown provided with a number of narrow slots 132 into which solder is drawn by capillary attraction and from which it emerges as needed. A satisfactory slot width has been found to be 0.006 inch. Such slots may be formed by any suitable means such as the use of a small thin-bladed circular saw.

In FIGS. 21 and 22 slots 134 do not extend completely through the workpiece and in FIG. 23 the openings are provided by drilling very fine holes 136 into a solid soldering tip 138.

This invention is especially valuable in microminiaturization work in hybrid and integrated circuits and eliminates the need for using solders which melt at relatively low temperature such as ternerary, bismuth-lead-tin alloys and indium solders which are not only expensive but have uncontrolled expansion upon change from liquid to solid state. For such fine work FIG. 24 shows a tip for ultrasmall soldering operations as upon a microcircuit board. In this tip there is room only for a single longitudinal passage 140 within the small diameter tubular tip 142 which is supported in a tip enlargement or sleeve 144. Within the bore of the enlargement may be located several rods 146 the spaces therebetween providing elongate passages into which solder entering through passage 140 may be drawn.

In FIG. 25 the tubular sleeve 148 extends somewhat beyond the lower ends of the rods 150 and may be compressed together as particularly shown in FIG. 26 to provide spaced lips 152 having a slot 154 therebetween. The width of this slot may vary and can be obtained by inserting a spacer of the selected width between the lips during the deforming operation. A slot width of 0.006 inch has proven to be satisfactory.

In the embodiment shown in FIGS. 27, 28 and 29 the tip is shown formed from a single shaft 156 of solid material which is axially drilled to provide a longitudinal opening 158. The end portion is provided with slots 160; these slots extend into communication with the axial opening 158. The latter opening may be filled with spaced parallel rods 162 and hence molten solder is free to enter through the slots 160 into the passage 158 and up the spaced longitudinal passages between the rods 162. A satisfactory slit width is 0.006 inch and for an ID 158 of 0.128 inch it has been found satisfactory to use five rods of 0.045 inch diameter.

In carrying out the method of this invention it will be apparent that a clean work surface is important, that suitable flux material must be applied, that the solder should be sufficiently fluid at the desired operating heat in order to flow readily along the work surface, that the openings in the tip should be of such size as to utilize capillary attraction as opposed to surface tension together with the applicable meniscus effects to apply solder to or withdraw solder from the work surface so as effectively to control the amount of solder applied and effectively remove excess solder. To this end the tip should be constructed with metal tubing having good heat characteristics such as copper, copper alloys, nickel, nickel alloys and, in certain heat-conducting relationships, aluminum. Of course, nickel, gold plated or tungsten tips or inserts are useable and iron materials where suitably protected have proven satisfactory. The core should preferably also be a good conductor of heat such as iron, steel or copper rods. Furthermore, the rods should readily be wettable by the solder and the overall tip length should be so proportioned as to insure that the work contacting surface is not overly cooled by heat loss.

It will be apparent that in an extensive desoldering operation solder must repeatedly be removed from the tip so that the cleaned tip may be reapplied to the work surface to withdraw more solder therefrom. The arrangement of FIG. 20 embodying a base 164 with some form of upright wire brush 166 pictorially represented as mounted thereon can be employed by wiping the slotted soldering tips over the brush, the filaments of which will comb through the slots 132, 134, 154 or 160 and fling the solder droplets forwardly into the protective enclosure provided by hood 168. Of course, other solder removal means may also be utilized such as a small shielded rotating wire brush against which the tip of the soldering iron may occasionally be placed and which will also remove accumulated solder from narrow slots.

An important effect of the aforesaid solder removal techniques with the tool of this invention is the fact that the operator need not employ two hands, either to melt and remove solder from the work or to clean the tool for its subsequent reapplication to the work to remove more solder. In small work such as printed circuitry, the operator's other hand is frequently occupied in holding the work piece or in maintaining a component in position for the soldering step.

As previously stressed the art of controlled application and removal of very thin coats of solder to a workpiece can be very exacting. The many difficulties attendant upon the perfections of this technique have resulted in a whole new science of soldering. Obviously it is important to effect a firm bond between the workpiece and the solder and to do this sufficient heat must be applied so that the workpiece is entirely wetted. However any over-application of heat can readily damage the workpiece or components associated therewith, can accelerate oxidation of the work surfaces and can impair the electrical conductivity of junctions being formed. For this reason a minor change in control of solder flow and removal can effect a major improvement in result. Until the advent of the present invention there was no single technique which would afford precise operator control of solder application and removal and hence the many prior attempts for excess solder removing manipulations involving vacuum devices, etc. have proven inadequate.

Due to the high and sustained heats encountered by soldering iron tips and the corrosive flux employed it is difficult to devise a soldering tip with a reasonably long life. In the present invention the sleeve or tube surrounding the rods is preferably of copper or copper alloy which may be electroplated with a coating of bright nickel which includes slight traces of iron. The rods themselves are preferably of Oxweld carbon steel commonly known as "Oxweld 65" and available from the Linde Company and are commonly used for electric welding. These rods are quite hard and rigid and are made of steel with a thin coating of copper. After their first use they become "tinned" with a coating of solder.

It has been found that simple copper rods have relatively short life and when exposed to air at sustained heat tend to oxidize and burn out. However, when protected as shown the resultant tip has a greatly extended life. With this arrangement the tip only need be ground off and retinned to provide a fresh work contact surface.

For convenience in constructing some of the several embodiments of the invention illustrated the following dimensions are given as having proven satisfactory. It will, of course, be appreciated that other dimensions may be selected within the spirit of the present invention.

In large size tips it has been found that for an overall tip diameter of 0.375 inch with an ID of 0.310 inch and a length of about 4.250 inches satisfactory results are obtained if 36 rods of 0.045 inch diameter are employed. Alternatively 19 rods of 0.065 inch diameter may be employed.

For shorter tips a satisfactory size has an OD of 0.250 inch, an ID of 0.185 inch, with a length of 1.5 inches and is filled with 12 rods of 0.045 inch diameter.

Still another satisfactory dimension has an OD of 0.187 inch with an ID of 0.128 inch and a length of 1.5 inches into the bore of which 5 rods of 0.045 inch size are inserted.

It will be obvious that as tip diameter is reduced, heat transmission problems increase. Accordingly in the next three described tips it is recommended that a jacket 145 of copper or other highly conductive heat material which has an OD of about 0.187 inch be added. Where the tip has an OD of 0.125 inch and an ID of 0.089 inch it may contain 7 rods of size 0.030 inch and be about 1.250 inches long.

As the smaller sizes are approached the tip is preferably stepped as shown in FIG. 24. One size has an OD of 0.065 inch at the very end 142 and an OD of 0.125 inch at a larger part 143 surrounded by a jacket of copper or the like to an overall size of 0.187 inch at point 144. The extreme tip 142 may be drilled to 0.026 inch ID by use of a 064 drill and the larger portion 144 may be drilled to an 0.089 inch diameter by the use of a 043 drill. This tip may be 1.250 inches long and the 0.089 inch bore 140 may be filled with 7 rods 146 of 0.030 inch size.

In the smallest embodiment so far tested the smallest OD size 142 was 0.043 inch with an ID bore 140 of 0.021 inch drilled with a 075 drill and the body OD 144 was 0.125 inch with an ID of 0.089 inch drilled with a 043 drill. The tip length was 1.250 inch and the larger bore was occupied by 7 rods 146 of 0.030 inch dimension.

The tube of FIG. 6(a) may have an OD of 0.187 inch, a length of 2.5 inches rod size of 0.045 inch and the flattened midportion of the tubing illustrated in FIGS. 6(c) and (d) and shown in end view in FIG. 7 may be about 0.215 inch ×0.145 inch.

In FIGS. 12, 13, 14 and 15 sheet material varying in thickness from 0.010 inch to 0.020 inch has proven satisfactory.

The width of the slots shown in the embodiment of FIGS. 19, 21, 22, 25, 27, 28 and 29 may vary in accordance with the characteristics of the solder, however slots ranging from 0.006 inch to 0.015 inch have proven satisfactory.

With any of the tips, but particularly in the embodiment illustrated in FIGS. 16, 17 and 18 it will be apparent that while in the molten state any undesirable contaminants may easily be expelled from the internal passages of the tip by application of a suitable pressure differential to the exposed open end of the passages as by blowing air or gas therethrough. In addition a decontaminant or flux may readily be flushed through these passages to assure a clean soldering tip for subsequent soldering operations.

In order to prevent entrapment of air or flux gases within the reservoir area and to allow their escape the fit between the tip and its holding socket such as the parts 34 and 28 of FIG. 1 and the equivalent parts of the other embodiments may be sufficiently loose to permit such escape. Alternatively a small opening 35 may be added to any of the several embodiments extending partially or entirely through the upper body portion of the tip as desired. Of course, such vent opening is not necessary in the embodiments of FIGS. 16, 17, 18.

It has been found that with the tool and method of the present invention even the most inexperienced personnel can perform soldering and desoldering operations like a professional. For example, with this invention, during the application of a controlled thin tinning coat to a printed circuit board the solder will flow on readily and yet the formation of excess gobs or peaks of solder on the work is prevented. Furthermore, the working face of the tool can readily be resurfaced by light application of a file or grinding stone thereto.

The present invention is of especial value in soldering and desoldering delicate microcircuits. The work involved is so small that much of it is performed under a magnifying glass. Though sufficient heat to render the contacted portion of solder liquid is necessary the liquified solder must be instantly removed from the work area so that the application of heat is at all times under rigid control to prevent damage to the very thin films of circuit boards and their various components. In such work it has been found advantageous to use a tip of the character shown in FIG. 24 with a single very small bore. It will be apparent that the bore diameter may vary with the composition of the solder since a hard solder may require a larger bore and a very soft solder may permit use of a smaller diameter. In one form this bore may taper to a wider external diameter away from the work so as to provide maximum heat flow to the work contacting tip.

I claim:

1. A tool for the controlled application of molten solder to a workpiece and for the controlled removal of excess molten solder from such workpiece so that only a relatively thin film remains on the workpiece said tool including:
   a plurality of separate elongate members of heat conductive material;
   a common support embracing such members in heat conductive relationship said support also retaining said members in a fixed relative relationship;
   said members and said support being coterminous at a work contacting portion;
   said members defining elongate passages extending from a position adjacent the work contacting portion of said tool into a portion of said tool remote from said work contacting portion; and
   means acting through the common support for raising the temperature of the tool in the passage area and adjacent the work contacting portion sufficiently to render solder fluid, so that solder stored in said passage may flow therefrom onto an unsoldered work surface and excess solder may flow back from said work contacting portion and be stored in the remote portion.

2. In a hand tool useful in performing soldering and desoldering operations on a workpiece, said tool being of elongate styluslike configuration and incorporating an electrically-energizable heat-generating member remotely located with respect to the workpiece-engaging end of said tool, such end lying along the longitudinal axis of said tool, the improvement which comprises:
   a heat-conducting chuck extending axially from said electrically-energizable member;
   a tip removably receivable in said chuck;
   said tip having at least one solder-conducting passageway parallel to the longitudinal axis of said tool, the cross-sectional dimension of such passageway being chosen to bring about the conduction of molten solder therethrough by capillary action;
   the said solder-conducting passageway having one terminus at the workpiece-engaging end of said tool as defined by that extremity of said tip remote from said electrically-energizable member, at which point said passageway terminates in a solder-receiving or solder-dispensing orifice;
   said tip including a heat conducting member closely associated with said passageway and continuing to the work engaging extremity thereof;
   said heat conducting member also serving to prevent deformation of said passageway during application of the tip to a workpiece; and
   the workpiece-engaging end of said tool being physically isolated from said electrically-energizable member by said chuck, so that the workpiece-engaging end of said tool, and hence the workpiece engaged thereby, is substantially protected from the deleterious effects of any flux field which may result from the electrical energization of said heat-generating member.

3. The hand tool of claim 2 wherein the passageway terminates in a slot located in the workpiece-engaging end of said tool.

4. The hand tool of claim 2 in which said tip has a plurality of solder-conducting passageways parallel both to one another and to the longitudinal axis of said tool, said passageways respectively terminating at the workpiece-engaging end of said tool in a plurality of solder-receiving or solder-dispensing orifices.

5. The hand tool of claim 4 in which said tip comprises a tubular sleeve containing a bundle of juxtapositioned rodlike members and the solder-conducting passageways comprise the interstices that are present within said bundle.

6. The hand tool of claim 4 wherein the workpiece-engaging end of the tool is formed of spaced fins.

7. A tool for use in connection with molten solder which comprises:
   a sleeve having an end;
   said sleeve being formed of a metal capable of conducting heat;
   a core located within said sleeve;
   said core having an end which is coplanar with said end of said sleeve;
   said core being formed of a metal capable of conducting heat and capable of being wetted by molten solder;
   said core having a plurality of capillary passages located therein adjacent to one another; and
   said passages extending away from said end of said core towards the interior of said sleeve.

8. A tool as claimed in claim 7 wherein:
   said core extends into said sleeve and terminates between the ends of said sleeve; and
   said capillary passages extend from said end into the interior of said sleeve at the end of said core within said sleeve.

9. A tool as claimed in claim 7 wherein:
   said sleeve has two ends and said core has two ends;
   each end of said core is adjacent to an end of said sleeve;
   one end of said sleeve and one end of said core are shaped so as to conform to the configuration of a workpiece adapted to be located with respect to said tool; and
   said capillary passages extend between both ends of said core.

10. A tool as claimed in claim 7 wherein:
    said core comprises a plurality of parallel rods located in contact with one another, the spaces between said rods defining said capillary passages.

11. A tool as claimed in claim 10 wherein:
said rods decrease in diameter from said end of said core towards the interior of said core.

12. A tool as claimed in claim 7 wherein:
said core comprises a coil of metal, said coil having spaces between the turns thereof defining said capillary passages.

13. A tool as claimed in claim 7 wherein:
said core comprises a coil of a corrugated metal sheet, the spaces between the turns of said coil defining said capillary passages.

14. A tool as claimed in claim 7 wherein:
said core comprises a plurality of parallel rods located in contact with one another, the spaces between said rods defining said capillary passages; and
the exterior rods of said plurality of rods are secured together so as to serve as such sleeve.

15. A tool as claimed in claim 7 wherein:
said sleeve is a coiled wire located around said core.

16. In a hand tool for the carefully controlled application of molten solder to and removal of molten solder from a workpiece including heat and shock vulnerable components, the improvement which comprises:
a casing formed of heat-conducting material and having a workpiece-engaging tip;
elongate rods within said casing defining a plurality of passageways;
each passageway opening at the workpiece-engaging tip of said casing; and
said casing serving to structurally retain said rods and passageways formed thereby in substantially parallel alignment while simultaneously providing a heat path to transmit heat to the workpiece-engaging tip portions of said passageways.